US009432612B2

(12) United States Patent
Bruhn et al.

(10) Patent No.: US 9,432,612 B2
(45) Date of Patent: Aug. 30, 2016

(54) ENVIRONMENTAL ADJUSTMENTS TO PERCEIVE TRUE CONTENT

(71) Applicant: EchoStar Technologies L.L.C., Englewood, CO (US)

(72) Inventors: Christopher William Bruhn, Aurora, CO (US); Phuc H. Nguyen, Parker, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 256 days.

(21) Appl. No.: 14/033,261

(22) Filed: Sep. 20, 2013

(65) Prior Publication Data

US 2015/0089551 A1    Mar. 26, 2015

(51) Int. Cl.
| | |
|---|---|
| *H04N 7/18* | (2006.01) |
| *H04N 5/58* | (2006.01) |
| *G09G 5/00* | (2006.01) |
| *H04N 21/41* | (2011.01) |
| *H04N 21/422* | (2011.01) |
| *H04N 21/485* | (2011.01) |
| *H04N 7/10* | (2006.01) |
| *H04N 17/00* | (2006.01) |
| *H04N 21/436* | (2011.01) |
| *H05B 37/02* | (2006.01) |
| *H04L 12/28* | (2006.01) |
| *G09G 5/02* | (2006.01) |
| *G09G 5/10* | (2006.01) |

(52) U.S. Cl.
CPC ............... *H04N 5/58* (2013.01); *G09G 5/00* (2013.01); *H04L 12/2827* (2013.01); *H04N 7/106* (2013.01); *H04N 17/004* (2013.01); *H04N 21/4131* (2013.01); *H04N 21/42202* (2013.01); *H04N 21/43615* (2013.01); *H04N 21/4854* (2013.01); *H05B 37/0218* (2013.01); *G09G 5/02* (2013.01); *G09G 5/10* (2013.01); *G09G 2320/0626* (2013.01); *G09G 2320/0666* (2013.01); *G09G 2340/14* (2013.01); *G09G 2360/144* (2013.01); *G09G 2360/16* (2013.01); *Y02B 20/46* (2013.01)

(58) Field of Classification Search
CPC ................... H04N 21/43615; H04N 21/42202
USPC ........................................................... 725/80
See application file for complete search history.

(56) References Cited

U.S. PATENT DOCUMENTS

| | | | |
|---|---|---|---|
| 2003/0081834 A1* | 5/2003 | Philomin et al. ............. | 382/190 |
| 2006/0107281 A1* | 5/2006 | Dunton ........................... | 725/11 |
| 2007/0242162 A1* | 10/2007 | Gutta et al. ................... | 348/645 |
| 2009/0167950 A1 | 7/2009 | Chen et al. | |
| 2012/0098960 A1 | 4/2012 | Fujino et al. | |
| 2012/0242232 A1 | 9/2012 | Yata et al. | |
| 2013/0061258 A1* | 3/2013 | Takaya et al. .................. | 725/10 |

FOREIGN PATENT DOCUMENTS

| | | |
|---|---|---|
| JP | 2008-193605 A | 8/2008 |
| WO | 2006/059263 A1 | 6/2006 |

\* cited by examiner

*Primary Examiner* — Pankaj Kumar
*Assistant Examiner* — Sahar Baig
(74) *Attorney, Agent, or Firm* — Seed IP Law Group PLLC

(57) ABSTRACT

Methods and systems to evaluate the ambient light in a local viewing environment where video content is being displayed, and to make adjustments to the ambient light, video display device, and/or video content to cause the perception of the color and brightness of the video content to the viewer to be true to what the video content producer intended the viewer to perceive.

12 Claims, 5 Drawing Sheets

ENVIRONMENTAL ADJUSTMENTS TO PERCEIVE TRUE CONTENT

BACKGROUND

1. Technical Field

The present disclosure relates to systems and methods for adjusting a viewer's perception of video content displayed on a viewing device in a local viewing environment so that the video content stream as perceived by the viewer will be truer to the color and brightness of the video content stream intended by the content providers.

2. Description of the Related Art

Many devices that display video content, such as LED displays or plasma displays, have the ability to adjust the brightness of the device depending on the ambient light detected in the local viewing environment. For example, in a living room or home theater system, if the display device detects that the room is dark or light, the device may dim or brighten the displayed image. This is done to lessen the contrast between the displayed content and the ambient light, making it easier for the eye to detect contrast levels displayed on the screen.

BRIEF SUMMARY

The present disclosure proposes systems and methods to analyze a video content stream for brightness and color values, measure characteristics of the ambient light within a local viewing environment, and make adjustments to either the ambient light, the display device, and/or the content prior to display, so that people viewing the content on the device in the viewing area will perceive the colors as intended by the content provider.

DETAILED DESCRIPTION

Figure 1:
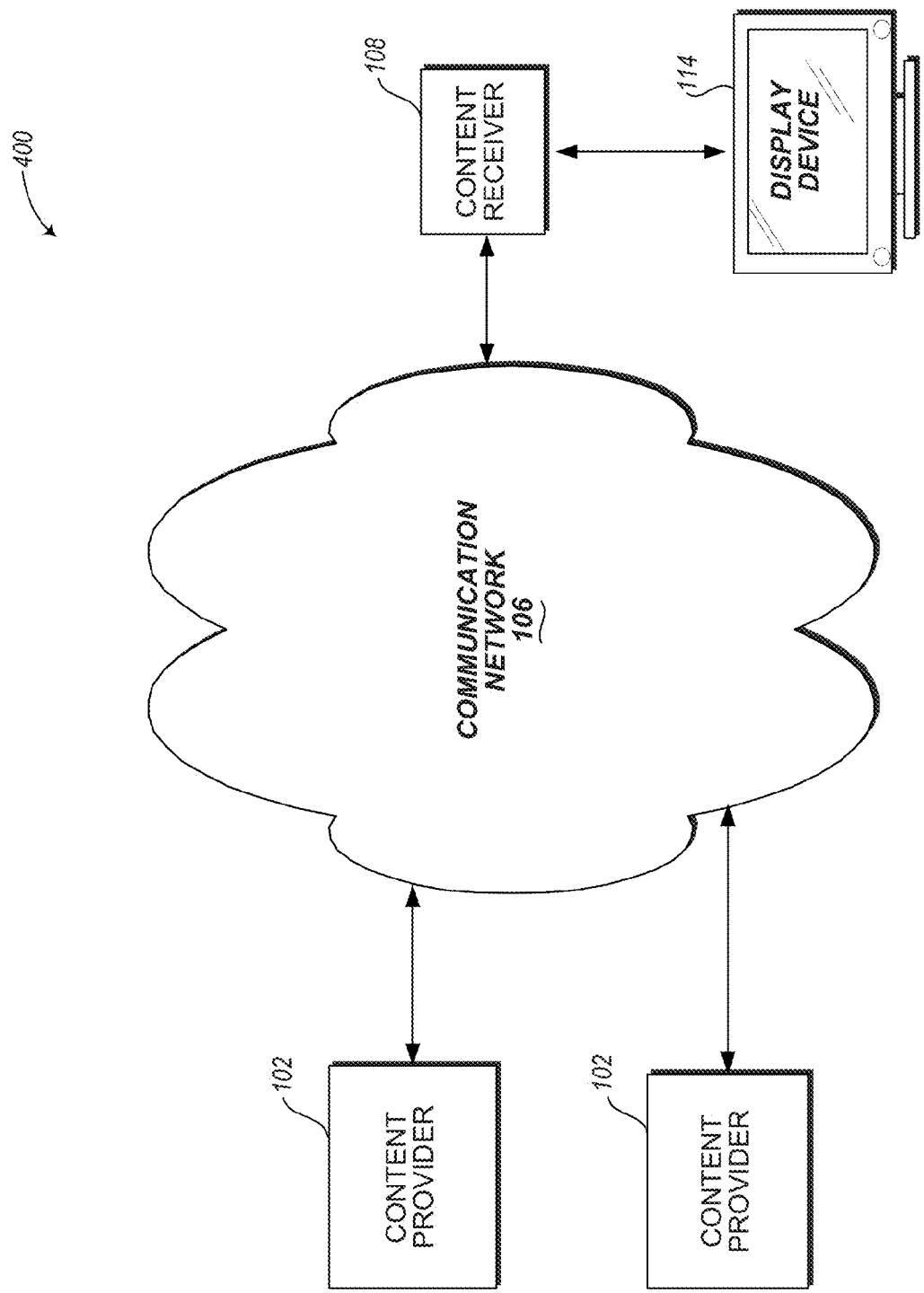
FIG. 1 is a context diagram showing a non-limiting embodiment of the relationship between content providers and a content receiver device.

FIG. 1 shows diagram 400 describing one embodiment of the relationship between content providers 102 and a content receiver device 108. Content providers 102 create and distribute video content including movies, television series, advertisements, television specials, sports events, documentaries, musical events, webcasts, and the like. Examples of content providers include ABC, NBC, CBS, HBO, Showtime, and AMC. Content providers 102 make the content available through a communication network 106 which may include but is not limited to satellite systems, cable systems, Internet networks, or over-the-air broadcasts. A content receiver 108, which may be a cable system or satellite system receiver, e.g. a set top box, receives content over communication network 106. Content receiver 108 may be attached to a display device 114 that may be a television display, personal computer, tablet, smart phone, content or video recorder. In addition, some content receivers 108 are able to receive content from devices such as VCRs, DVD players, personal computers, tablets, smart phones and the like. In one or more embodiments, the described system may be contained within a content receiver 108 (set top box).

Figure 2:
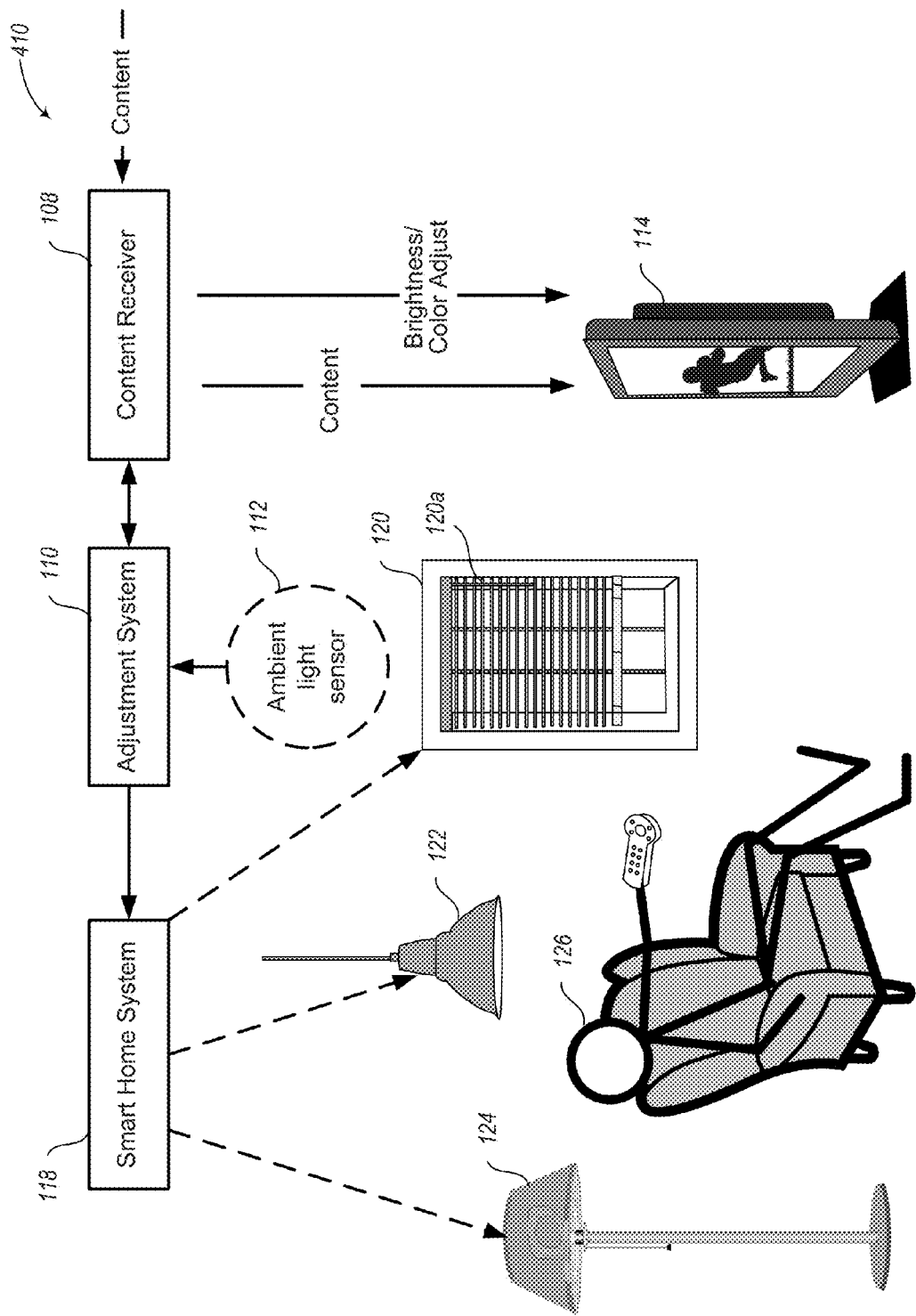
FIG. 2 shows a diagram representing a non-limiting embodiment of a display device within a local viewing environment with three light sources and a single viewer.

FIG. 2 shows a local viewing environment 410 with a viewer 126 watching a video presentation on display 114. The room contains a number of light sources used to control ambient lighting within the room, including artificial lighting, by adjusting floor lamp 124, ceiling light 122, and/or by adjusting blinds 120a to the amount of light coming through the exterior window 120. Each of these light sources in one or more embodiments may be controlled by a smart home system 118 using, for example, a Wi-Fi, Bluetooth, or wired connection along with a ZigBee or RF4CE standard networked user interface. This interface is able to identify, connect to, and control lighting systems within a viewing location, for example by turning lights on, turning them off, or adjusting them electronically.

According to one or more non-limiting embodiments, a number of ambient light sensing devices 112 may be used to determine ambient light conditions such as brightness and color saturation within local viewing environment 410. For example, a light-sensing camera may evaluate brightness and/or color saturation and provide data for the smart home system 118 to adjust room lighting. This may be a stand-alone camera connected to the smart home system 118 in a wired or wireless fashion; may be part of a cable or satellite receiver 108; or may be located on the display device 114 itself. In addition, cameras on smart phones or tablets may be used to capture ambient light information for the system used to determine lighting adjustments for optimal viewing. In some embodiments, more than one ambient light sensor 112 may be used to evaluate the ambient light in local viewing environment 420.

In some embodiments, after determining ambient light levels in the local viewing environment, adjustment system 110 then determines the appropriate level of ambient light in the room and sends commands to the smart home system 118 to adjust one or more lighting sources in the viewing area. For example, lights 122, 124 can be turned on, off or dimmed, or a curtain or blind 120a can be opened, closed, or partially closed to adjust the amount of light entering into the room.

In some non-limiting embodiments, the location, direction, type and intensity of the light source relative to the display 114 and the viewer 126 is also known, for example by using cameras, smart glasses or a Microsoft Kinect™ device. The adjustment system 110 is then able to send commands to the smart home system 118 to adjust the appropriate light sources for optimal viewing, for example by increasing the brightness of lights not in the viewer's line of sight of display device 114.

In addition to "smart home" technologies, lighting fixtures such as a low-level lamp (not shown) may also be directly attached to a content receiver 108, for example through a USB connection, and placed in the room as ambient light adjustment.

In addition, the content receiver 108, as well as the adjustment system 110, smart home system 118, and display device 114 in other non-limiting embodiments may be implemented through a personal computer, a tablet computer, or a smart phone.

Ambient lighting adjustment plays an important role in the ability for viewer 126 to perceive colors on display 114 in the way that that content provider 102 intended the colors to be perceived.

With the introduction of digital high-definition television signals in conjunction with high-resolution video displays 114 such as LED and plasma displays that provide an extremely clear and detailed viewing experience, it is possible for viewer 126 to perceive colors while viewing video content the way the content provider 102 intended them to be seen. An important factor that contributes to display image color and contrast quality in high-definition displays 114 is the ability for the display device 114 to produce dark blacks, and therefore brighter colors. Generally, the darker the black level of the display, the higher level of contrast and the more realistic the colors will appear. Videophiles and video professionals frequently refer to the quality of the display based on how "black" the black level of the display is. Black levels are also applicable to other display devices such as tablets, smart phones, monitors, and other video content viewing platforms. Generally, the darker the black level, the higher the contrast of the display and therefore the greater ability to display color and brightness accurately.

With these advances in signal and display technology, a video content provider 102, for example a director of a movie, a television series, a news program, or a commercial, is free to create a specific type of viewing experience with carefully chosen colors and contrasts. The challenge is to have those colors and contrasts accurately displayed on the display device 114 such that the viewer 126 can perceive them in the same way that content provider 102 intended them to be perceived.

There are two ways that ambient light in local viewing environment 410 may distort viewer's 126 perceptions of the video content's colors and contrasts. The first is the effect of very dim ambient light in viewing area 410, in conjunction with a dark image on the display 114, that causes the eyes of viewer 126 to begin to change into night vision mode, which causes viewer's 126 eyes to begin to perceive colors differently. The second has to do with the suffusion of a particular color of light throughout local viewing environment 410 that distorts the viewer's 126 perception of colors. These distortions may be corrected with adjustments to ambient light within local viewing environment 410.

Preventing Night Vision

When ambient lighting in local viewing environment 410 is very dim or completely dark and when dark or black images are displayed on display device 114, viewer's 126 eyes are likely to go into night vision. This effect can be noticed by viewer 126 when a display device 114, particularly a plasma display, is displaying black. These areas do not actually have a complete absence of light—there is always some light output in these areas. For example, at a higher level of ambient light in local viewing environment 410, the blacks on the display will look very black, like "black holes." However, as ambient light levels decrease and there are no other lights on in the local viewing environment, the photochemical process in the viewer's eyes will start to charge up in the purple aspect creating the night vision effect. The viewer's eyes will become more sensitive and the small amount of light output in the black areas will begin to be perceived increasingly as shades of gray. This will become increasingly apparent as darker scenes are displayed in a dark viewing area for longer periods of time. As ambient light is increased, the photochemical process will reverse and the viewer's eyes will go out of night vision, allowing the viewer 126 to fully perceive brightness and black levels in the content, and to perceive colors more accurately. The ambient light level detected by ambient light sensor 112 may be affected for a number of reasons, including turning on/off lights in the area, changes in outside light from the sun's position or from clouds blocking sunlight, or people entering/leaving the area with dark clothing that absorbs ambient light.

Figure 3:
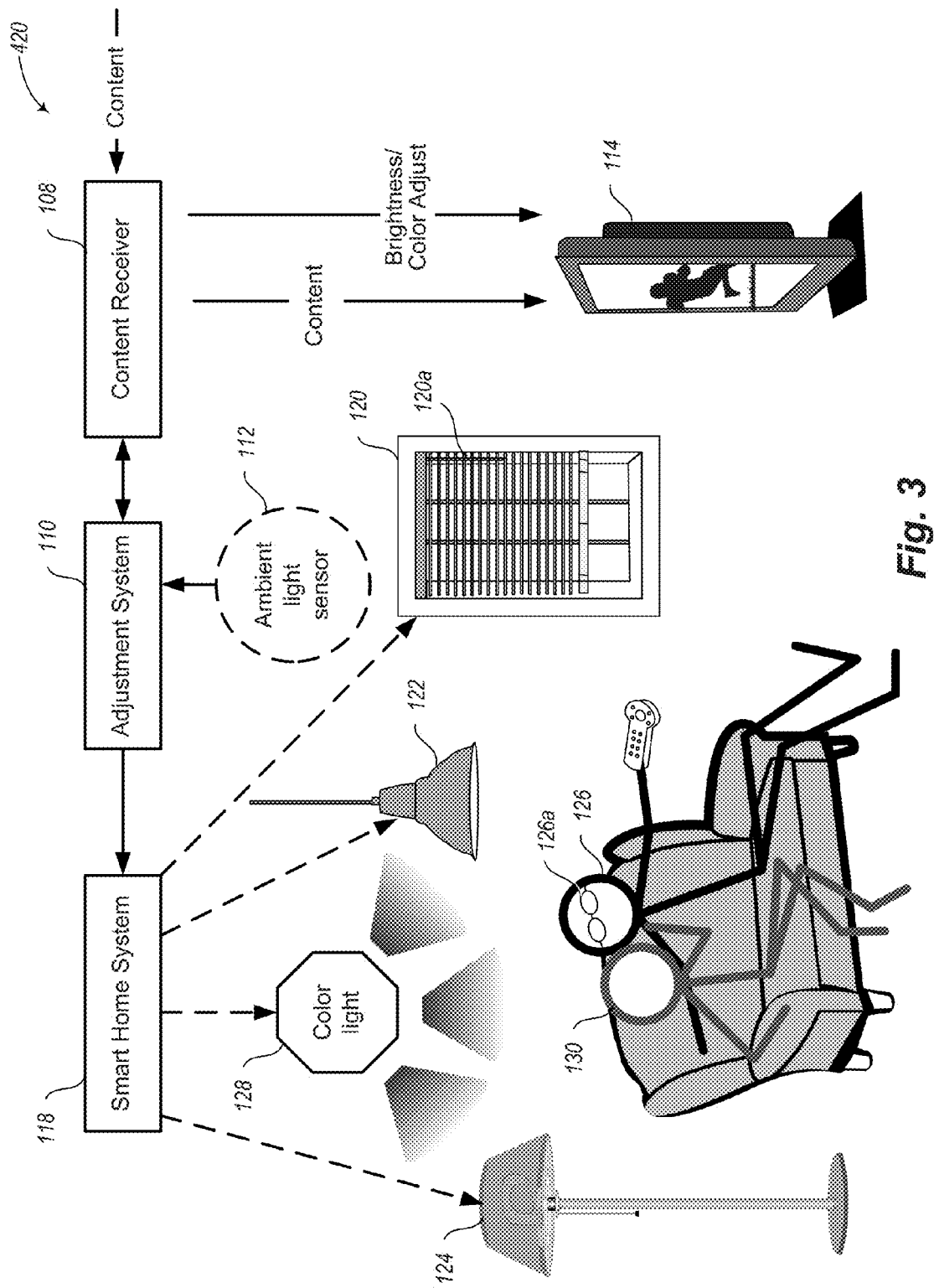
FIG. 3 shows a diagram representing a non-limiting embodiment of a display device within a local viewing environment with four light sources and two viewers.

FIG. 3 shows local viewing environment 420 with two viewers 126, 130, watching display 114. The darkness level at which each viewer's eyes go into night vision varies by individual. In one embodiment, viewers go through a calibration process to determine each viewer's eyes' night vision threshold level to determine the desired ambient light characteristics for optimal viewing for the most accurate color perception. This information is used to determine adjustments needed to overall ambient lighting by adjustment system 110, for example so that ambient light levels do not fall below any viewer's threshold level. Some nonexclusive embodiments of this calibration process include monitoring the pupil of the viewer's eyes to using dilation measurements to determine when the eye is about to go into night vision. Another embodiment includes determining night vision threshold by using a tablet application coupled with a questionnaire that displays images of varying color and contrast and asks the viewer questions on how the image appears.

In another embodiment, the adjustment system 110 may know which viewers are in the local viewing environment and will determine an optimal ambient light level that is a function of each individual viewer's night vision threshold level as viewers enter or leave local viewing environment 420. For example, a family with a dad, mom, son, and daughter regularly watch movies on a high-definition television in the living room of their home. If the adjustment system 110 recognizes that only the dad is in the living room, the system will adjust the ambient light according to the dad's night vision threshold so that the dad will experience the color and brightness levels intended by the movie director. If the mom, son, and daughter join him, then the adjustment system 110 may adjust the light level in between the night vision thresholds of all family members for maximum viewing enjoyment.

Adjusting for Color-Suffused Ambient Light.

Another example of color distortion that viewers 126 and 130 may experience is suffusion of color in the ambient light. For example, a room will take on a rosy hue when direct sunlight shines through red-tinted blinds 120a and into the local viewing environment 420. When this happens, content viewed on display device 114 intended to be white, such as a snowfield, will appear pinkish white.

The adjustment system 110 uses ambient light sensor 112 to detect if the ambient light level is saturated with a specific color. In one embodiment, the adjustment system 110 would then compensate by increasing the ambient full-spectrum white light level of the room to be at least the level to squash those colors into a "noise floor white light" where the suffused color is drowned out. In other embodiments, complementary colors of light may be introduced into the local viewing environment 420 to offset the effects of the suffused color by using additive colors. In these non-exclusive embodiments, the viewer will be less likely to notice a suffused color tinting the video content on the display device 114.

In another embodiment, wearable personal technology, for example smart glasses such as Google® glass 126a, can be integrated into the system to provide a user with a viewing experience that is truer to the content provider's intent. These glasses 126a have built-in cameras that generally capture the user's field of view, and this information can be networked back to the adjustment system 110. When viewer 126 looks at display device 114, glasses 126a are recording what the user's eyes are seeing, including the display brightness and color saturation as perceived on display 114, as well as ambient light values in local viewing environment 420. This information is then sent to the adjustment system 110 via Wi-Fi or Bluetooth networking, lighting, to the display device 114, or to the content stream 146 as described above.

Figure 4:
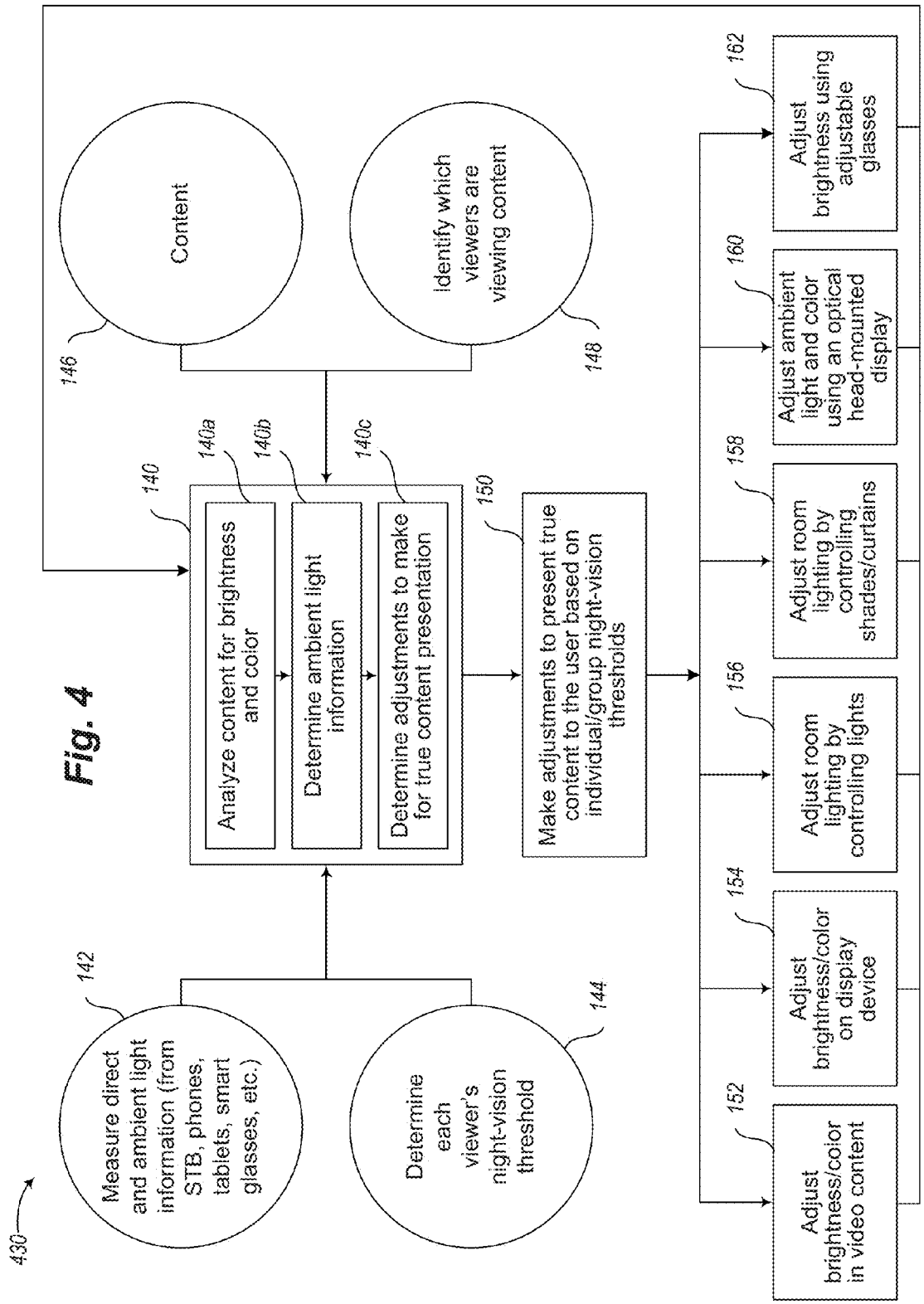
FIG. 4 shows a block diagram representing one non-limiting embodiment of a system for adjusting viewers' perceptions of displayed video content.

FIG. 4 shows block diagram 430 representing one non-limiting embodiment of a system for adjusting viewer's perception of displayed video content using ambient lighting.

Module 140 describes one embodiment of the process of evaluating video content and ambient light, and making adjustments so that a viewer is able to perceive the content as intended by content provider 102. Step 140a analyzes the content for brightness and color, receives content 146 as input and analyzes the currently displayed scene to determine brightness and color values. In some embodiments, the content as currently displayed on display device 114 is analyzed. In other embodiments, the analysis would be performed by evaluating the ambient light and the color and brightness attributes of scenes yet to be displayed. This may be performed, for example, by delaying presentation of content to users for a fixed amount, for example 90 seconds, for analysis or by analyzing the future video content 146 that has not been displayed yet. In other embodiments, the color and brightness scene attributes may be determined by data received by the content receiver outside of the video data stream and sent to module 140.

Step 140b determines ambient light information, and includes the ability to measure direct and ambient light information 142. The sensors 112 used to determine ambient lighting may include specialized light sensors connected via hardwire or wireless network connection, or installed directly into a content receiver 108, e.g. a set top box. The sensors 112 may also include a camera on a phone or tablet, or other devices such as a camera in smart glasses as described herein. In addition, more than one ambient light sensor 112 may be used to evaluate the ambient light in local viewing environment 420.

In addition to determining the brightness and saturation level within a local viewing environment, ambient light sensors 112, in some non-limiting embodiments, may determine where individual viewers 126, 130 are sitting in local viewing environment 420, as well as the location and direction of display device 114 relative to the viewers. The system may also be able to determine the direction and intensity of one or more light sources 122, 124 within the viewing area 420, and whether each light source, if made brighter, would be directly in a viewer's line-of-sight as the viewer watches display device 114. In some embodiments, ambient light sensor 112 is also able to identify light sources that, when turned up, would not shine directly in the viewer's eyes and therefore be a more appropriate light source to use to adjust ambient lighting. For example, if step 140b, using ambient light sensor 112, determines that there are four lamps in the room and that two lamps are behind viewers, those lamps should be brightened first to adjust ambient lighting. In another non-limiting embodiment, the orientation of display device 114 is known relative to light sources, and ambient light sources can be adjusted so that reflection or glare of the light source off of the display device is minimized. In this way, the system may determine the most appropriate lights to brighten or dim to adjust ambient lighting for viewers' 126, 130 optimal viewing experience of content on display device 114.

In one or more embodiments, step 140c determines adjustments to make by gathering data from content analysis step 140a and ambient light determination step 140b, by identifying viewers of the content 148 in the local viewing environment 420, and by determining each viewer's night vision threshold 144 as described above. In some embodiments, step 140c is performed by adjustment system 110 shown in FIGS. 2 and 3. Additional information about each viewer's vision may also be included and used to determine the adjustments to make to ambient lighting, display devices 114, and/or content stream 146 before the content is presented on display device 114.

Module 150 makes adjustments by implementing the adjustments determined in module 140. In some embodiments, module 150 is executed by smart home system 110 shown in FIGS. 2 and 3, where adjustments commands are sent to ambient light systems, to display devices 114, and/or to content stream 146 through content receiver 108. Examples of these commands may include: increase full-spectrum ambient lighting, decrease red-hue ambient lighting in five seconds, increase display brightness, decreased display contrast in 20 seconds, add magenta to content stream, etc.

Modules 152-162 are example processes for making specific ambient light, display device, or content adjustments so that the viewer is able to perceive video content the way that the content provided intended it to be perceived. The adjust brightness/color in content stream module 152, in one embodiment, interacts with content receiver 108 to modify video content data to adjust color levels and/or brightness levels in real time to adjust for ambient light distortions, such as to tint the video content blue. This adjustment may be done in conjunction with ambient light level adjustments and/or display device adjustments, or done alone.

The video content may also be adjusted before the content is displayed to the viewer. In one embodiment, the system looks back into the video content stream that has not yet been displayed to determine the features such as brightness and color saturation of the video images. In some embodiments the system determines appropriate adjustments for optimal user viewing and then alters the video stream to reflect those adjustments before sending the video content to the display device 114. For example, adjusting the color in the video stream to compensate for a rosy hue in a room or adjusting the brightness in a scene so that a viewer's eyes do not go into night vision. In other non-limiting embodiments, step 152 sends instructions to display device 144 to change brightness levels and color saturation levels before each scene is displayed.

The adjust brightness/color on display device module 154, in one embodiment, communicates directly with display device 114 to adjust brightness, white balance, color balance, and/or visual adjustments available on display device 114. In some embodiments, the smart home system 118 is able to communicate with the display device directly and to control the brightness level of the display to adjust ambient light in the local viewing environment.

The adjust room lighting by controlling lights module 156, in one embodiment, controls devices within the local viewing environment that adjust ambient lighting by actively producing lighting. In one embodiment, the system adjusts lights to increase or decrease the amount of full-spectrum white light in the room. In other embodiments, the system adjust lights with one or more colors to correct for ambient light distortions in the local viewing environment 420 that are biased toward a particular hue.

The adjust room lighting by controlling shades/curtains module 158, in one embodiment, controls one or more mechanisms that allow light into the local viewing environment 420 from outside areas. For example blinds 120a on an exterior window 120 that allows sunlight entering viewing area 420, or a sliding door that separates the viewing area from an adjacent lighted room.

The adjust ambient light and color using an optical head-mounted display module 160, in one or more embodiments, enables smart glasses 126a worn by viewer 126 to adjust ambient light conditions. For example, glasses having LEDs next to the viewer's eye are able to produce levels of light to keep the viewer's eyes from going into night vision, or to counteract ambient light color saturation by increasing full-spectrum white light brightness or by introducing a complementary color to the viewer's eye. In addition, a camera mechanism on the glasses would continually assess displayed content from the viewer's point of view, and provide that information to the adjustment system 110 to determine adjustments to make to the glasses or to other ambient lighting in the local viewing environment 420.

The adjust brightness using adjustable glasses module 162, in one embodiment includes glasses worn by the viewer with lenses made of material with adjustable opacity to adjust the viewer's perceived ambient lighting of the viewing area. In one example, the glasses lenses have a liquid in them with electric current that changes the amount and quality of light passing through the lenses.

One example of the system described in FIG. 4 is a viewer 126 viewing a movie in a home theater. The theater has a blue curtain covering a window being struck by direct sunlight causing a bluish hue throughout the room, causing whites on the display device to appear bluish, and yellows to appear greenish. In one embodiment, the ambient light sensor 112 would know the user is likely seeing a bluish scene with greenish flowers, while the content receiver 108 knows that it is displaying a predominantly white scene with yellow flowers. The adjustment system 110 uses the feedback to change the ambient light in the viewing area using color light 128, either increasing full-spectrum white light or introducing a complementary color to offset the bluish hue. This process would continue throughout the movie shown on display device 114.

In another example, viewers are watching an action-adventure movie in their living room at night with scenes taking place within a cave on the side of a snow-covered mountain. The movie may show several scenes that jump between a dark interior of the cave, possibly with a small camp fire, and the bright white exterior of the mountain including snowfields around the cave entrance. The movie may visually track characters as they walk from within the cave out the snowfield in bright light, and back into the cave again. In this example, an extended scene within the darkness of the cave may require the system to increase ambient light in the local viewing environment 420 so that viewers' 126, 130 eyes stay out of night vision and their perceptions of color from the campfire within the cave appear truer to how the movie was originally filmed. If step 140 knows that after switching an outside bright scene to a dark scene in the cave, in 20 seconds a bright white snowfield will again be displayed, the system may, for example, not raise the ambient light if the viewer's night vision will not be activated within 20 seconds. Furthermore, the system 430 will sample the ambient light to determine color saturation that may need adjusting, for example, by increasing the brightness of complementary colors. In the example of sun striking a red curtain filling the room with a rosy tint, a complementary color adjustment using color light 128 would be required at a greater intensity when a bright white snowy background is displayed, and at a lesser intensity if the dark cave interior was displayed.

Figure 5:
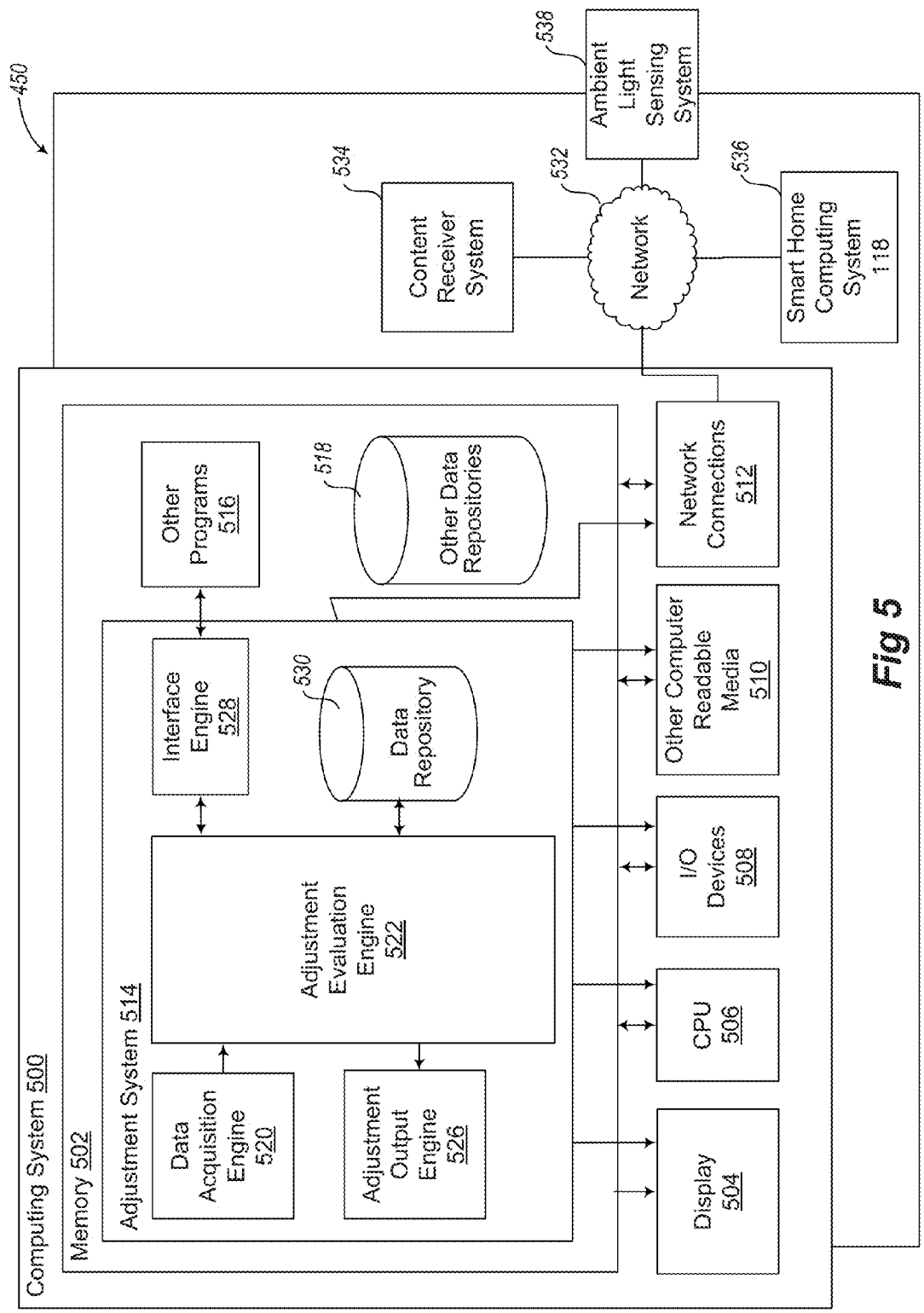
FIG. 5 is a diagram showing an embodiment of implementing the system on a computer.

FIG. 5 shows, at 450, an example block diagram of a computing system 500 for practicing embodiments of the adjustment method described herein, and for practicing embodiments of an adjustment system, according to one embodiment.

One or more general purpose or special purpose computing systems may be used to implement the computer- and network-based methods, techniques, and systems for the adjustment method described herein and for practicing embodiments of an adjustment system. More specifically, the computing system 500 may comprise one or more distinct computing systems present at distributed locations. In addition, each block shown may represent one or more such blocks as appropriate to a specific embodiment or may be combined with other blocks. Moreover, in one embodiment, the various components of an adjustment system 514 may physically reside on one or more machines, which use standard inter-process communication mechanisms (e.g., TCP/IP) to communicate with each other. Further, an adjustment system may be implemented in software, hardware, firmware, or in some combination to achieve the capabilities described herein.

In the embodiment shown, the computing system 500 comprises a computer memory ("memory") 502, a display 504, one or more Central Processing Units ("CPU") 506, Input/Output devices 508 (e.g., keyboard, mouse, joystick, track pad, CRT or LCD display, and the like), other computer-readable media 510, and network connections 512. An adjustment system 514 is shown residing in the memory 502. In other embodiments, some portion of the contents or some or all of the components of the adjustment system 514 may be stored on and/or transmitted over the other computer-readable media 510. The components of the adjustment system 514 preferably execute on one or more CPUs 506 and analyze ambient lighting and video content, and generate commands to adjust ambient lighting and/or content display, as described herein. Other code or programs 516 (e.g., a Web server, a database management system, and the like) and potentially other data repositories, such as data repository 518, also reside in the memory 502, and preferably execute on one or more CPUs 506. Not all of the components in FIG. 5 are required for each implementation. For example, some embodiments embedded in other software do not provide means for user input, display, a customer computing system, or other components. Currently, some inputs to the adjustment system 514 are automatically generated, but other inputs may be entered manually to supplement data acquired through automated means.

In a typical embodiment, the adjustment system 514 includes a data acquisition engine 520; an adjustment evaluation engine 522; an adjustment output generation engine 526, an interface engine 528, and a data repository 530 which includes locations and types of adjustment devices in the local viewing environment. Other and/or different modules may be implemented. In addition, the adjustment system 514 interacts via a network 532 with a content receiver system 534, an ambient light sensing system 538, and/or a smart home computing system 536. Communication system network 532 may utilize one or more protocols to communicate via one or more physical networks, including local area networks, wireless networks, dedicated lines, intranets, the Internet, and the like.

The adjustment evaluation engine 522 performs at least some of the functions described with reference to FIGS. 1-4.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   determining, by an adjustment computing device, a specific night vision threshold for each of a plurality of viewers by performing a calibration process for each viewer;
   receiving, at the adjustment computing device, a video content stream for display on a display device, the display device being in a local viewing environment;
   analyzing, by the adjustment computing device, the video content stream for brightness and color values;
   measuring ambient light values for the local viewing environment, the ambient light values including brightness;
   identifying viewers of the plurality of viewers in the local viewing environment;
   determining, by the adjustment computing device and based on the brightness and color values of the video content stream, the ambient light values for the local viewing environment, and the specific night vision thresholds of the viewers in the local viewing environment, adjustments to the ambient light values of the local viewing environment that will cause viewing of the video content stream on the display device to appear truer to the brightness and color of the video content stream;
   identifying an adjustment device in proximity to the local viewing environment that can adjust the ambient light values within the local viewing environment based on the determined adjustments, the ambient light values including brightness;
   activating, by the adjustment computing device, the adjustment device based on the determined adjustments in synchronization with the content stream displayed on the display device to cause viewed content, by the viewers in the local viewing environment, to appear truer to the brightness and color values of the video content stream.

2. A method comprising:
   determining, by an adjustment computing device, a night vision threshold for each of a plurality of viewers;
   receiving, at the adjustment computing device, a video content stream for display on a display device, the display device being in a local viewing environment;
   analyzing, by the adjustment computing device, the video content stream for brightness and color values;
   measuring ambient light values for the local viewing environment, the ambient light values including brightness and color values;
   determining which viewers of the plurality of viewers are in the local viewing environment;
   determining, by the adjustment computing device and based on the brightness and color values of the video content stream, the ambient light values for the local viewing environment, and the night vision thresholds of the viewers in the local viewing environment, adjustments to the ambient light values of the local viewing environment that will cause viewing of the video content stream on the display device to appear truer to the brightness and color of the video content stream;
   identifying one or more adjustment devices in proximity to the local viewing environment that can adjust the ambient light values within the local viewing environment based on the determined adjustments, the ambient light values including brightness and color values;
   activating, by the adjustment computing device, one or more of the identified adjustment devices based on the determined adjustments in synchronization with the content stream displayed on the display device to cause viewed content, by the viewers in the local viewing environment, to appear truer to the brightness and color values of the video content stream.

3. A method as in claim 2 wherein activating the one or more adjustment devices comprises:
   sending, by the adjustment computing device, a control signal to the one or more adjustment devices to modify a brightness of lights within the local viewing environment.

4. A method as in claim 2 wherein activating the one or more adjustment devices comprises:
   sending, by the adjustment computing device, a control signal to the one or more adjustment devices to modify a position of window coverings in the local viewing environment.

5. A method as in claim 2 wherein activating the one or more adjustment devices comprises:
   sending, by the adjustment computing device, a control signal to the one or more adjustment devices to modify a color saturation in the local viewing environment.

6. A method as in claim 2, further comprising:
   wherein activating the one or more adjustment devices includes modifying, by the adjustment computing device, the video content stream before display; and
   adjusting a color represented in the video content stream to cause viewed content to appear truer to the brightness and color values of the received video content stream.

7. A system comprising:
   an input configured to receive a measure of each of a plurality of viewers' night vision threshold;
   an input configured to receive a video content stream of video content for display on a display device within a local viewing environment;
   an input configured to receive ambient light values for the local viewing environment, the ambient light values including brightness and color values;
   an input configured to determine which viewers of the plurality of viewers are within the local viewing environment;

a device database identifying controllable devices within the local viewing environment that are able to adjust ambient light values within the local viewing environment;
an analysis module configured to
receive the video content stream,
to analyze the video content of the content video stream to determine brightness and color values of the video content, and
to output the brightness and color values of the video content;
an adjustment device that can communicate with the controllable devices identified within the device database to adjust the ambient light values within the local viewing environment; and
a processing module configured to
receive the brightness and color values of the video content from the analysis module,
analyze the received ambient light values for the local viewing environment;
determine, using the received brightness and color values of the video content, the analyzed ambient light values for the local viewing environment, the night vision thresholds of the viewers in the local viewing environment, and the controllable devices identified in the device database used to adjust ambient light, commands to be sent to the adjustment device to adjust ambient lighting; and
send the determined commands to the adjustment device to communicate with the controllable devices to adjust ambient lighting in the local viewing environment for content displayed on the display device to appear, to the viewers in the local viewing environment, truer to the brightness and color values of the video content.

8. A system as in claim 7 wherein:
adjust ambient lighting further comprises add full-spectrum white light to the local viewing environment.

9. A system as in claim 7 wherein:
adjust ambient lighting further comprises modify the position of exterior window coverings in the local viewing environment.

10. A system as in claim 7 wherein:
adjust ambient lighting further comprises modify the color saturation in the local viewing environment.

11. A system as in claim 7, further comprising:
wherein the adjustment device is able to modify the content stream before display;
wherein the processing module is further configured to determine, using the brightness and color values of the analyzed video content stream and the received ambient lighting information, commands to be sent to the adjustment device to modify the content stream before display.

12. A computer-readable non-transitory storage medium storing instructions which, when executed by a processor in a computing system, cause the processor to:
determine a specific night vision threshold for each of a plurality of viewers;
receive a video content stream for display on a display device, the display device being in a local viewing environment;
analyze the video content stream for brightness and color values;
measure ambient light values for the local viewing environment, the ambient light values including brightness;
identifying viewers of the plurality of viewers in the local viewing environment;
determine, based on the brightness and color values of the video content stream, the ambient light values for the local viewing environment, and the specific night vision thresholds of the viewers in the local viewing environment, adjustments to the ambient light values of the local viewing environment that will cause viewing of the video content stream on the display device to appear truer to the brightness and color of the video content stream;
identify an adjustment device in proximity to the local viewing environment that can adjust the ambient light values within the local viewing environment based on the determined adjustments, the ambient light values including brightness;
activate the adjustment device based on the determined adjustments in synchronization with the content stream displayed on the display device to cause viewed content, by the viewers in the local viewing environment to appear truer to the brightness and color values of the video content stream.

* * * * *